United States Patent
Huang et al.

(10) Patent No.: US 11,865,791 B2
(45) Date of Patent: Jan. 9, 2024

(54) INDUCTION WELDING WITH AN ELECTROMAGNETIC FIELD CONCENTRATOR

(71) Applicant: Rohr, Inc., Chula Vista, CA (US)

(72) Inventors: Jonathan S. Huang, Pasadena, CA (US); Michael van Tooren, San Diego, CA (US); Jeffrey D. Woods, Beaumont, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/566,219

(22) Filed: Dec. 30, 2021

(65) Prior Publication Data

US 2023/0211568 A1  Jul. 6, 2023

(51) Int. Cl.
*B29C 65/36* (2006.01)
*B29C 65/00* (2006.01)

(52) U.S. Cl.
CPC .............. *B29C 65/36* (2013.01); *B29C 66/45* (2013.01)

(58) Field of Classification Search
CPC ................................ B29C 65/36; B29C 66/45
See application file for complete search history.

(56) References Cited

U.S. PATENT DOCUMENTS

| | | | |
|---|---|---|---|
| 2,483,973 A | 10/1949 | Goettings | |
| 2,846,554 A | 8/1958 | Baffrey | |
| 4,978,825 A * | 12/1990 | Schmidt | B29C 65/3668 156/274.2 |
| 5,013,878 A | 5/1991 | Fries, Jr. | |
| 5,047,605 A | 9/1991 | Ogden | |
| 5,438,181 A | 8/1995 | Volkmann | |
| 5,444,220 A | 8/1995 | Hansen | |

(Continued)

FOREIGN PATENT DOCUMENTS

| | | | | |
|---|---|---|---|---|
| CN | 203936495 U | | 11/2014 | |
| CN | 106232328 A * | | 12/2016 | B29C 65/3656 |

(Continued)

OTHER PUBLICATIONS

Patel, "Finite Element Electromagnetic (EM) Analyses of Induction Heating of Thermoplastic Composites". (Master's thesis). 2019, https://scholarcommons.sc.edu/etd/5118.

(Continued)

*Primary Examiner* — Daniel McNally
(74) *Attorney, Agent, or Firm* — Getz Balich LLC

(57) ABSTRACT

During a manufacturing method, an induction welder is provided that includes a concentrator and a coil extending through a receptacle in the concentrator. The receptacle projects into the concentrator from a face surface of the concentrator. A first thermoplastic body arranged with a second thermoplastic body are provided. The first thermoplastic body is located next to the face surface. The first thermoplastic body is induction welded to the second thermoplastic body to provide a weld seam between the first thermoplastic body and the second thermoplastic body. The concentrator extends along a portion of the weld seam. The induction welding includes: generating an electromagnetic field with the coil; and concentrating a portion of the electromagnetic field with the concentrator onto a region of the first thermoplastic body.

16 Claims, 14 Drawing Sheets

(56) References Cited

U.S. PATENT DOCUMENTS

| | | | |
|---|---|---|---|
| 5,635,094 A | 6/1997 | Hansen | |
| 7,459,053 B2 | 12/2008 | Bone, Jr. | |
| 10,449,749 B1 | 10/2019 | Calder | |
| 2006/0124626 A1 | 6/2006 | Kupfer | |
| 2017/0120506 A1* | 5/2017 | Bierlein | B65B 51/30 |
| 2020/0206469 A1 | 7/2020 | Morris | |
| 2021/0001567 A1 | 1/2021 | Ogale | |
| 2021/0039332 A1 | 2/2021 | Dichiara | |
| 2021/0039334 A1 | 2/2021 | Dichiara | |
| 2021/0040575 A1 | 2/2021 | Ferry | |

FOREIGN PATENT DOCUMENTS

| | | | | |
|---|---|---|---|---|
| GB | 849672 A | 9/1960 | | |
| JP | 2020115446 A | 7/2020 | | |
| SE | 503509 C2 * | 7/1996 | | B29C 65/32 |
| WO | 1990008027 A1 | 7/1990 | | |

OTHER PUBLICATIONS

EP search report for EP22217220.7 dated May 26, 2023.

* cited by examiner

INDUCTION WELDING WITH AN ELECTROMAGNETIC FIELD CONCENTRATOR

BACKGROUND

1. Technical Field

This disclosure relates generally to joining bodies together and, more particularly, to induction welding.

2. Background Information

It is known in the art to join discrete bodies together using induction welding. These joined bodies are typically constructed from like materials; e.g., fiber-reinforced composite. The discrete bodies are induction welded together using an induction welder. Various types and configurations of induction welders are known in the art. While these known induction welders have various benefits, there is still room in the art for improvement. For example, there is a need in the art for an induction welder and method that can provide an enhanced and/or tuned electromagnetic field.

SUMMARY OF THE DISCLOSURE

According to an aspect of the present disclosure, a manufacturing method is provided. During this manufacturing method, an induction welder is provided that includes a concentrator and a coil extending through a receptacle in the concentrator. The receptacle projects into the concentrator from a face surface of the concentrator. A first thermoplastic body arranged with a second thermoplastic body are provided. The first thermoplastic body is located next to the face surface. The first thermoplastic body is induction welded to the second thermoplastic body to provide a weld seam between the first thermoplastic body and the second thermoplastic body. The concentrator extends along a portion of the weld seam. The induction welding includes: generating an electromagnetic field with the coil; and concentrating a portion of the electromagnetic field with the concentrator onto a region of the first thermoplastic body.

According to another aspect of the present disclosure, another manufacturing method is provided. During this manufacturing method, an induction welder is provided that includes a first concentrator, a second concentrator and a coil extending within a first receptacle in the first concentrator and within a second receptacle in the second concentrator. The first receptacle projects into the first concentrator from a first face surface of the first concentrator. The second receptacle projects into the second concentrator from a second face surface of the second concentrator. A first thermoplastic body arranged with a second thermoplastic body are provided. The first thermoplastic body is located next to the first face surface and the second face surface. The first thermoplastic body is induction welded to the second thermoplastic body to provide a weld seam between the first thermoplastic body and the second thermoplastic body. the first concentrator is spaced from the second concentrator along the weld seam. The induction welding includes: generating an electromagnetic field with the coil; and concentrating the electromagnetic field with the first concentrator and the second concentrator onto respective regions of the first thermoplastic body.

According to still another aspect of the present disclosure, another manufacturing method is provided. During this manufacturing method, an induction welder is provided that includes a concentrator and a coil extending through a receptacle in the concentrator. The receptacle projects into the concentrator from a face surface of the concentrator. A first thermoplastic body arranged with a second thermoplastic body are provided. The first thermoplastic body is located next to the face surface. The first thermoplastic body is induction welded to the second thermoplastic body to provide a weld seam between the first thermoplastic body and the second thermoplastic body while the induction welder is maintained stationary over the first thermoplastic body. The induction welding includes: generating an electromagnetic field with the coil; and concentrating at least a portion the electromagnetic field with the concentrator onto a region of the first thermoplastic body.

The concentrator may be arranged at a first end of the first thermoplastic body. The concentrator may be spaced from a second end of the thermoplastic body that is opposite the first end.

The induction welder may be maintained stationary during the induction welding.

The concentrator may have a concentrator length along a centerline. The weld seam may have a seam length along the centerline that is greater than the concentrator length.

The seam length may be at least two times greater than the concentrator length.

The receptacle may project vertically into the concentrator from the face surface to an end of the receptacle. The receptacle may extend laterally within the concentrator between opposing sides of the receptacle. The receptacle may extend longitudinally within the concentrator along a centerline. The coil may be seated and may extend longitudinally along the centerline within the receptacle.

An open space may extend vertically between the first thermoplastic body and the coil.

An open space may extend vertically between the first thermoplastic body and the concentrator.

The coil may be vertically flush with the face surface.

The coil may be recessed vertically into the receptacle from the face surface.

The coil may be thermally coupled to the concentrator through a conductive interface.

The manufacturing method may also include cooling the coil and/or the concentrator using liquid coolant.

The cooling may include directing the liquid coolant through a bore of the coil.

The induction welder may also include a second concentrator. The coil may extend through a second receptacle in the second concentrator. The second receptacle may project into the second concentrator from a second face surface of the second concentrator. The second concentrator may extend along a second portion of the weld seam. The induction welding may also include concentrating a second portion of the electromagnetic field with the second concentrator onto a second region of the first thermoplastic body.

The concentrator may be spaced from the second concentrator along the weld seam.

A first end portion of the weld seam proximate a first end of the first thermoplastic body may be longitudinally overlapped by the concentrator. A second end portion of the weld seam proximate a second end of the first thermoplastic body may be longitudinally overlapped by the second concentrator. An intermediate portion of the weld seam longitudinally between the first end portion and the second end portion may be longitudinally misaligned from the concentrator and the second concentrator.

A workpiece may include the first thermoplastic body and the second thermoplastic body. A thickness of the workpiece along the weld seam may be uniform.

A workpiece may include the first thermoplastic body and the second thermoplastic body. A thickness of the workpiece along the weld seam may vary.

A workpiece may include the first thermoplastic body and the second thermoplastic body. The workpiece along a first portion of the weld seam may have a first thickness. The first portion of the weld seam may be overlapped by the concentrator. The workpiece along a second portion of the weld seam may have a second thickness that is different than the first thickness. The second portion of the weld seam may be misaligned from the concentrator.

The present disclosure may include any one or more of the individual features disclosed above and/or below alone or in any combination thereof.

The coil may have a circular cross-sectional geometry.

The coil may have a polygonal cross-sectional geometry.

The foregoing features and the operation of the invention will become more apparent in light of the following description and the accompanying drawings.

DETAILED DESCRIPTION

Figure 1:
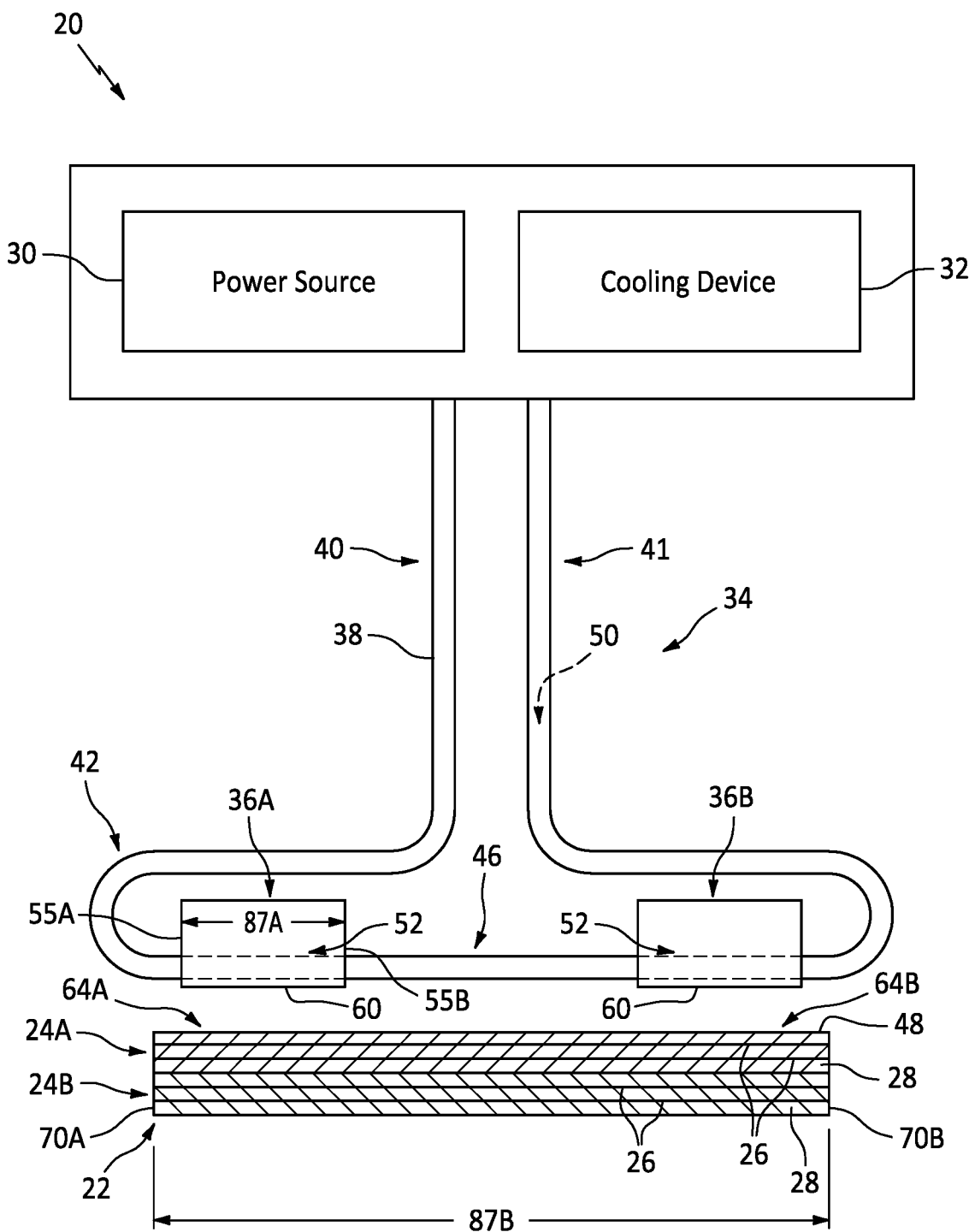
FIG. 1 is a schematic illustration of an induction welder for induction welding a workpiece.

FIG. 1 illustrates an induction welder 20 for induction welding a workpiece 22. This workpiece 22 may include two or more bodies 24A and 24B (generally referred to as "24"), where the induction welder 20 may induction weld these workpiece bodies 24 together. Each of the workpiece bodies 24 is formed from an induction weldable material such as, but not limited to, a fiber-reinforced thermoplastic. Each of the workpiece bodies 24, for example, may be constructed from or otherwise include fiber reinforcement 26 (e.g., carbon fibers) embedded within a thermoplastic matrix 28. The induction welder 20 of FIG. 1 includes a power source 30, a cooling device 32 and a coil structure 34. The induction welder 20 of FIG. 1 also includes one or more electromagnetic (EM) field concentrators 36A and 36B (generally referred to as "36") selectively arranged with the coil structure 34.

The power source 30 is configured to generate a periodic electrical current. The power source 30, for example, may be configured as a high-frequency current source. The power source 30 may be or otherwise include an alternating current (AC) generator, transformer, amplifier, etc. Alternatively, the power source 30 may include a direct current (DC) generator, transformer, amplifier, battery, etc. electrically coupled with an oscillator. The present disclosure, however, is not limited to such exemplary power sources.

The cooling device 32 is configured to flow fluid (e.g., liquid coolant) through the coil structure 34. The cooling device 32, for example, may be configured as a liquid pump coupled with a coolant reservoir and a heat exchanger. The present disclosure, however, is not limited to such an exemplary cooling device.

Figure 2:
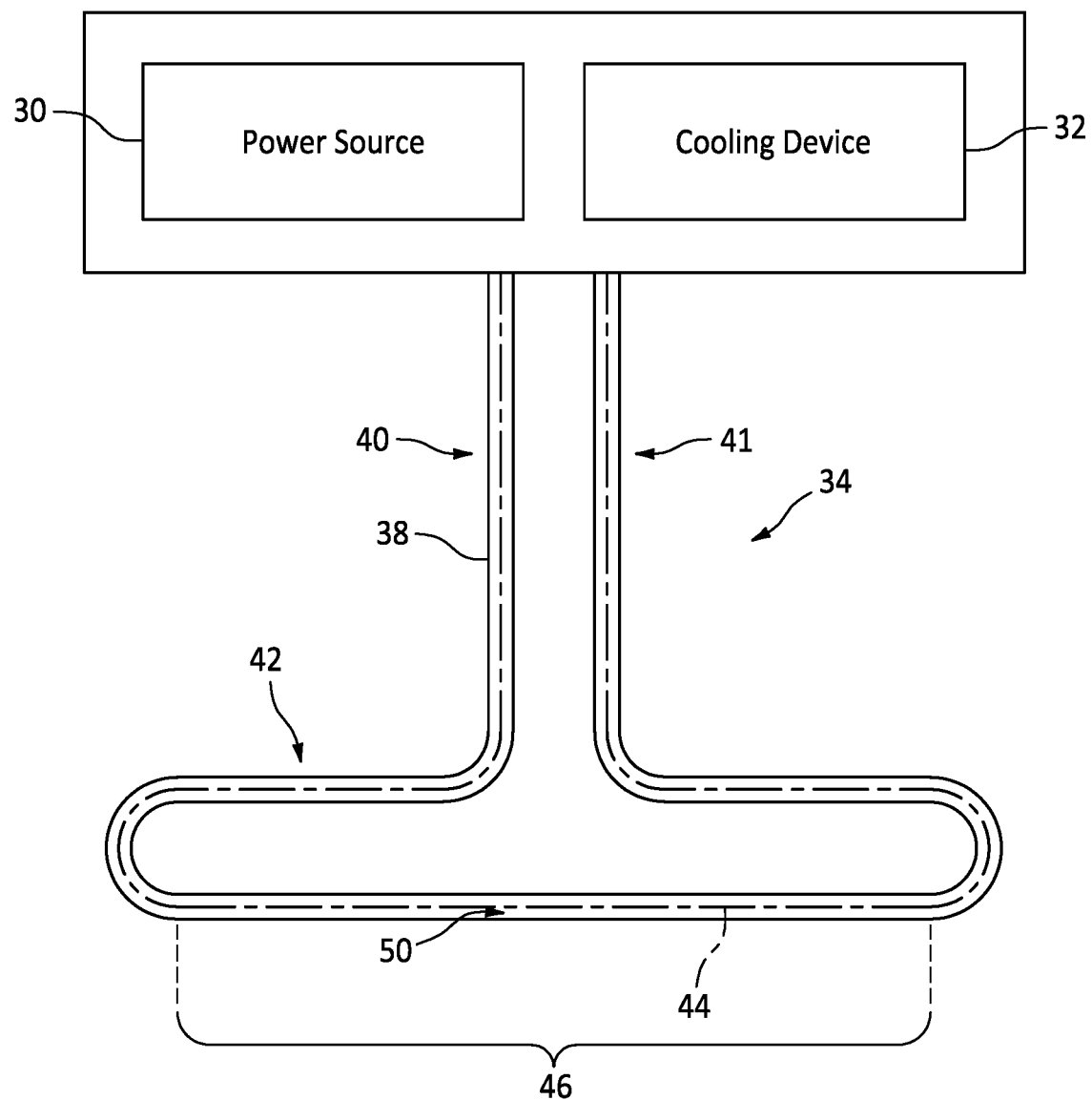
FIG. 2 is a schematic illustration of a coil structure configured with a power source and a cooling device.

Referring to FIG. 2, the coil structure 34 may be formed from or otherwise include a single length (or multiple end-to-end interconnected lengths) of electrically conductive tubing 38. This tubing 38 is constructed from electrically conductive material such as metal; e.g., copper (Cu). The coil structure 34 of FIG. 2 includes an (e.g., tubular) electrical first lead 40, an (e.g., tubular) electrical second lead 41 and an (e.g., tubular) induction welding coil 42.

The first lead 40 may be a first section of the coil structure 34 and its electrically conductive tubing 38. The second lead 41 may be a second section of the coil structure 34 and its electrically conductive tubing 38. The first lead 40 may be arranged parallel with the second lead 41. The first lead 40 and the second lead 41 are connected to opposing ends of the induction welding coil 42. The first lead 40 and the second lead 41 electrically couple the induction welding coil 42 to respective terminals of the power source 30.

The induction welding coil 42 may be an intermediate section of the coil structure 34 and its electrically conductive tubing 38 longitudinally between the first lead 40 and the second lead 41. The induction welding coil 42 may be configured as an elongated loop. The induction welding coil 42 of FIG. 2, for example, extends along a non-straight (e.g., generally racetrack shaped) portion of a longitudinal centerline 44 of the coil structure 34 between and to the coil ends. The induction welding coil 42 of FIG. 2 includes at least (or only) one welding (e.g., bottom side) segment 46. The induction welding coil 42, for example, may be configured as a single hairpin coil. The welding segment 46 may be configured to substantially match a contour of an exterior surface 48 of the workpiece 22 of FIG. 1 to be induction welded. The welding segment 46, for example, may be straight where the workpiece 22 has a flat exterior surface. The welding segment 46 may alternatively be non-straight (e.g., curved, compound, etc.) where the workpiece exterior surface 48 is a non-straight; e.g., curved, compound, etc. The present disclosure, however, is not limited to the foregoing exemplary induction welding coil configurations.

The coil structure 34 of FIG. 2 is configured with an internal bore 50. This internal bore 50 extends longitudinally along the coil centerline 44 through the coil structure 34 and its components 40-42 between and to opposing distal ends of the coil structure 34 and its leads 40 and 41. The internal bore 50 is fluidly coupled with the cooling device 32 through couplings at the structure ends. The first lead 40 and the second lead 41 thereby fluidly couple the induction welding coil 42 to the cooling device 32.

Figure 3:
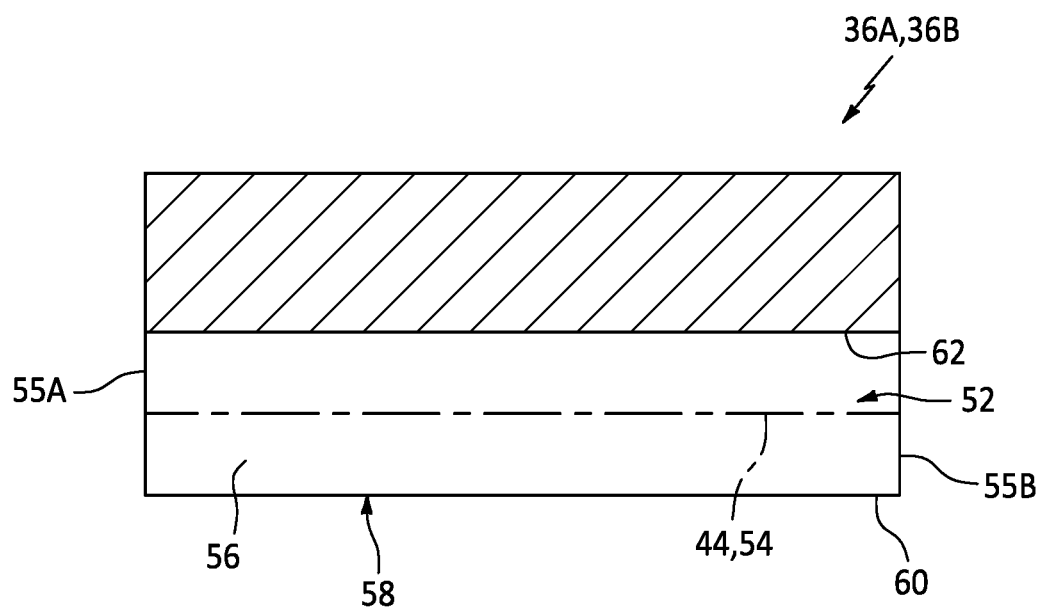
FIG. 3 is a side sectional illustration of an electromagnetic field concentrator.
Figure 4:
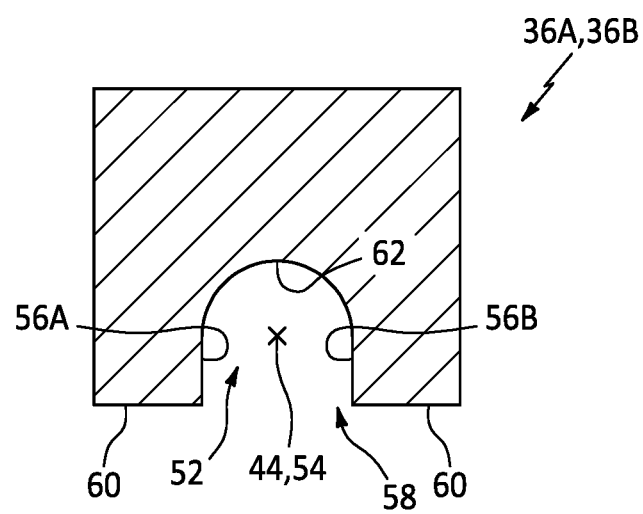
FIG. 4 is a cross-sectional illustration of the electromagnetic field concentrator.

Referring to FIG. 3, each of the EM field concentrators 36 is configured with an induction welding coil receptacle 52; e.g., a channel. This coil receptacle 52 extends longitudinally along a longitudinal centerline 54 of the coil receptacle 52 through the respective EM field concentrator 36 between and to a first end 55A of the respective EM field concentrator 36 and a second end 55B of the respective EM field concentrator 36, where the receptacle centerline 54 may be parallel with and/or coaxial with the coil centerline 44 along the welding segment 46; see also FIG. 5. Referring to FIG. 4, the coil receptacle 52 extends laterally within the respective EM field concentrator 36 between and to opposing sides 56A and 56B (generally referred to as "56") of the coil receptacle 52. The coil receptacle 52 projects vertically (e.g., partially) into the respective EM field concentrator 36 from a receptacle opening 58 in a face surface 60 of the respective EM field concentrator 36 to an end 62 of the coil receptacle 52. This face surface 60 may be configured to substantially match the exterior surface contour of the workpiece 22 of FIG. 1 to be induction welded. The face surface 60, for example, may be flat where the workpiece 22 has the flat exterior surface. The face surface 60 may alternatively have a non-flat (e.g., curved, compound, concave, convex, etc.) where the workpiece exterior surface 48 is a non-flat.

Figure 5:
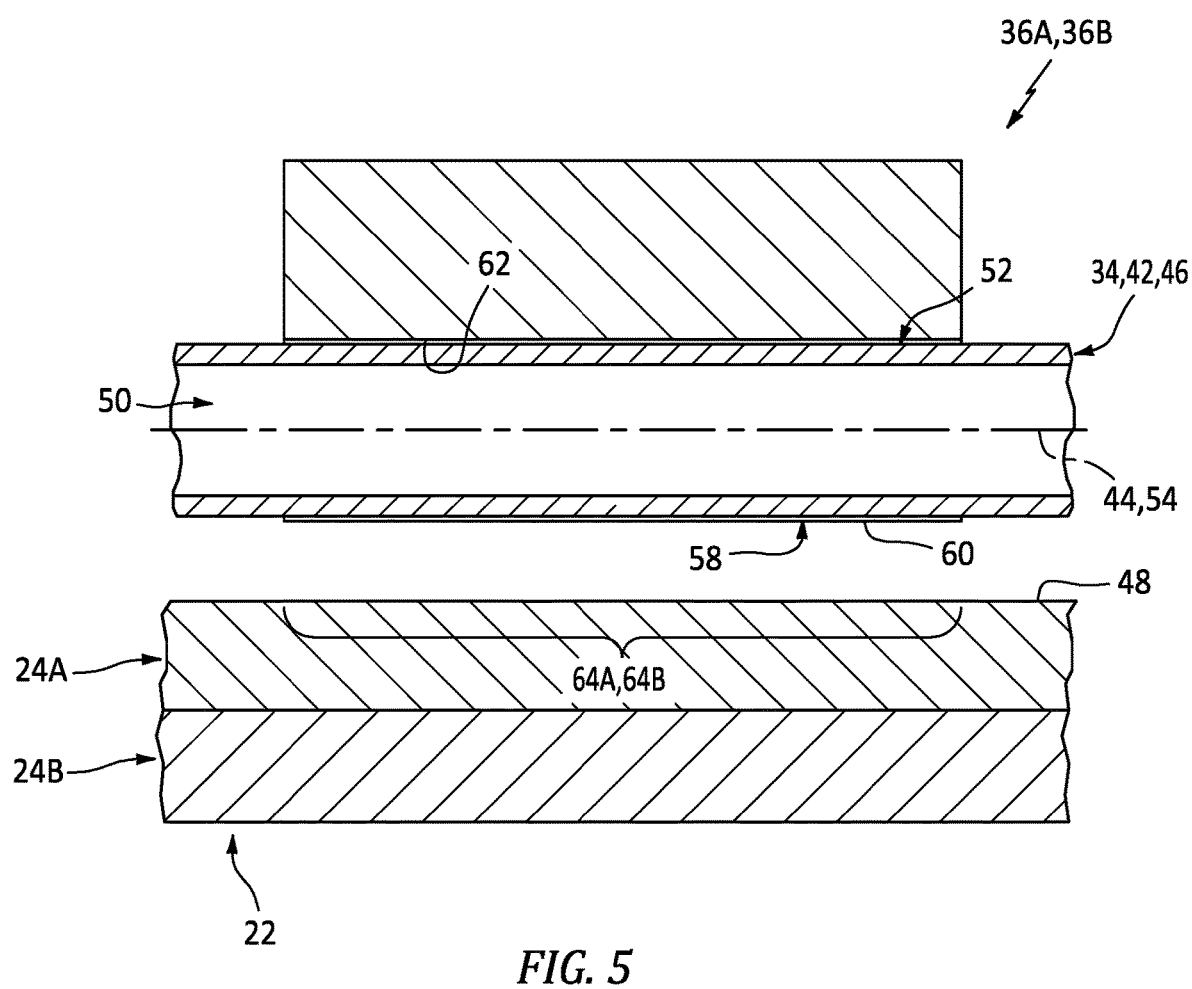
FIG. 5 is a side sectional illustration of a portion of the induction welder next to the workpiece.
Figure 6:
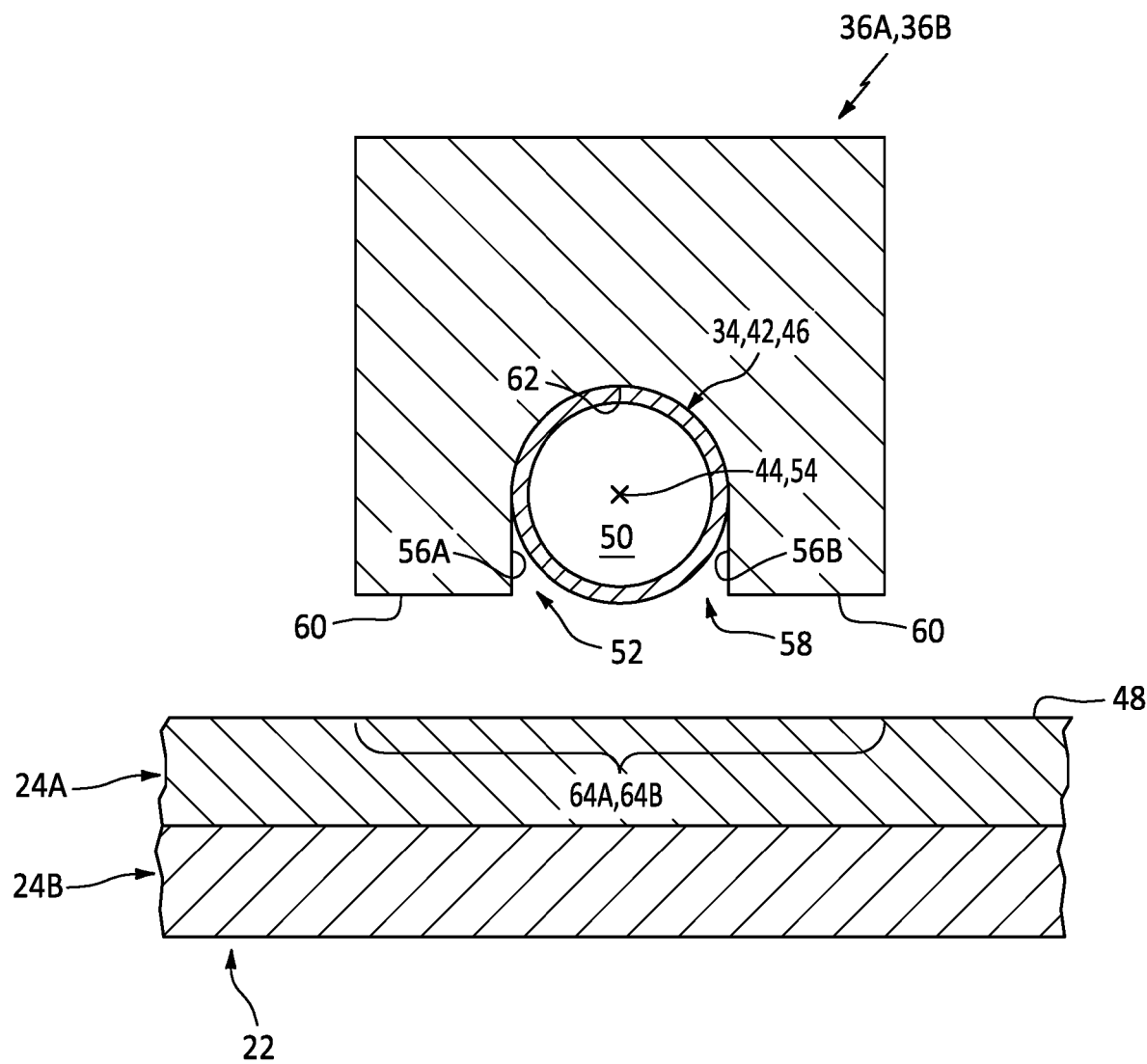
FIG. 6 is a cross-sectional illustration of a portion of the induction welder next to the workpiece.
Figure 7A:
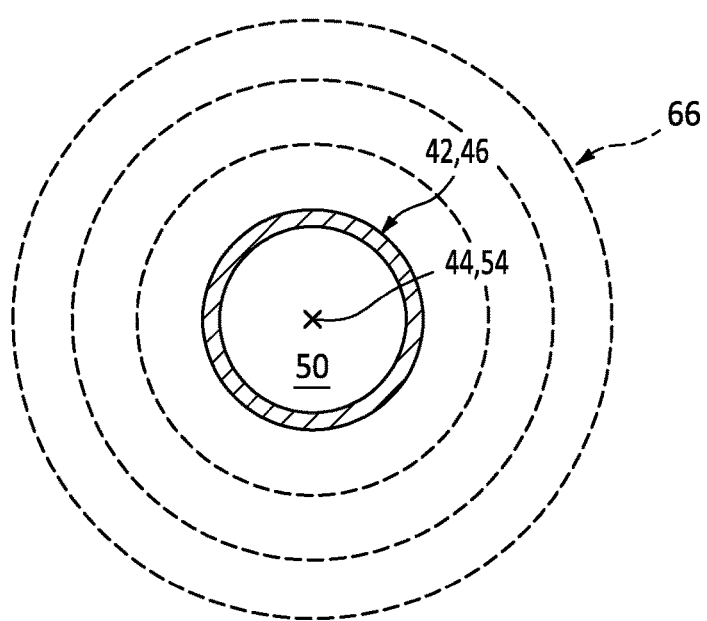
FIG. 7A is an illustration depicting an unfocused electromagnetic field generated by an induction welding coil.
Figure 7B:
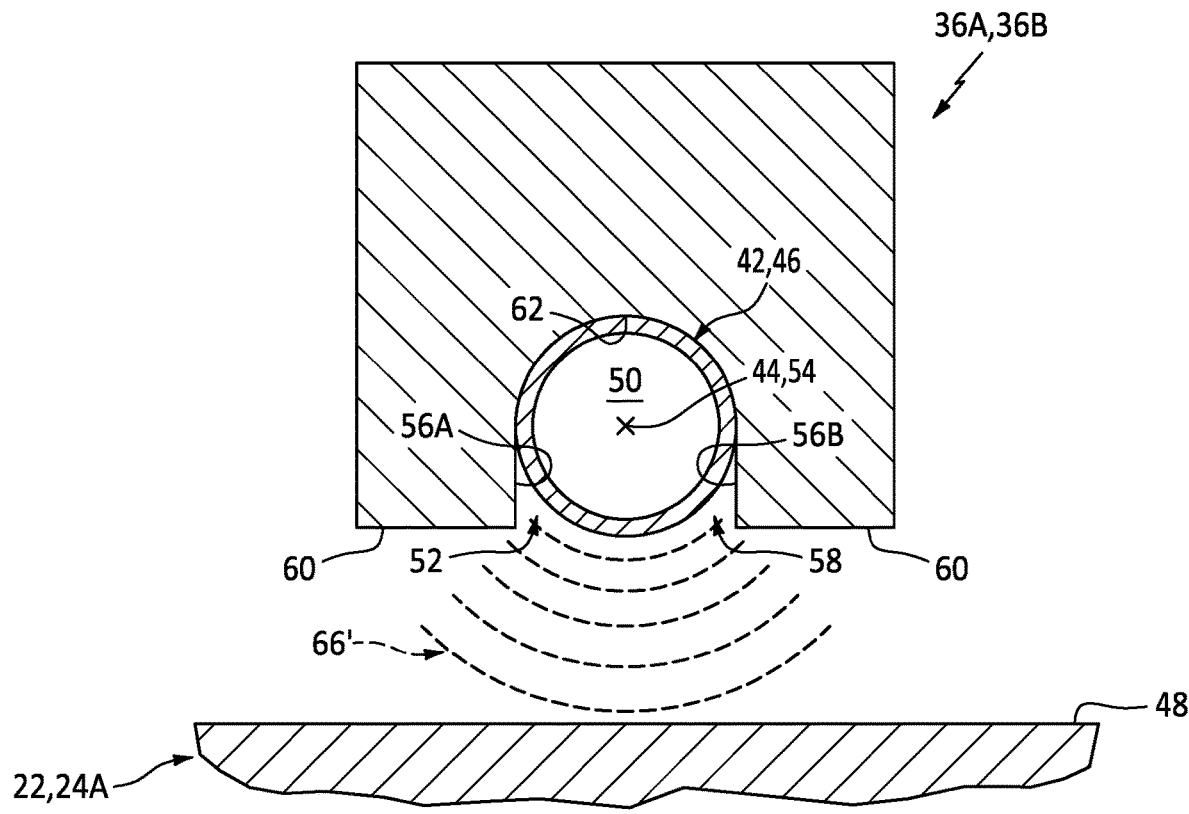
FIG. 7B is an illustration depicting an electromagnetic field generated by the induction welding coil and concentrated by the electromagnetic field concentrator.

Referring to FIGS. 5 and 6, the induction welding coil 42 is received in each coil receptacle 52. The welding segment 46 of the induction welding coil 42 of FIGS. 5 and 6, for example, is seated within the coil receptacle 52. The induction welding coil 42 of FIG. 5 extends longitudinally along the centerline 44, 54 within (e.g., through) the coil receptacle 52. With this arrangement, each EM field concentrator 36A, 36B of FIGS. 5 and 6 covers a select portion of the welding segment 46 at the receptacle sides 56 and the receptacle end 62. Each EM field concentrator 36 may thereby concentrate a select portion of an electromagnetic field generated by the induction welding coil 42 and its welding segment 46 towards/onto a respective region 64A, 64B (generally referred to as "64") of the workpiece 22 and at least its (e.g., top) vertically closest workpiece body 24A through the receptacle opening 58. More particularly, rather than emit the electromagnetic field 66 of FIG. 7A radially all about the induction welding coil 42 and its welding segment 46, each electromagnetic field 66' of FIG. 7B emitted from the induction welding coil 42 and its welding segment 46 may be focused towards/onto the region. Each EM field concentrator 36 may thereby effectively magnify a power of the electromagnetic field during the induction welding of the workpiece bodies 24 together.

Figure 8A:
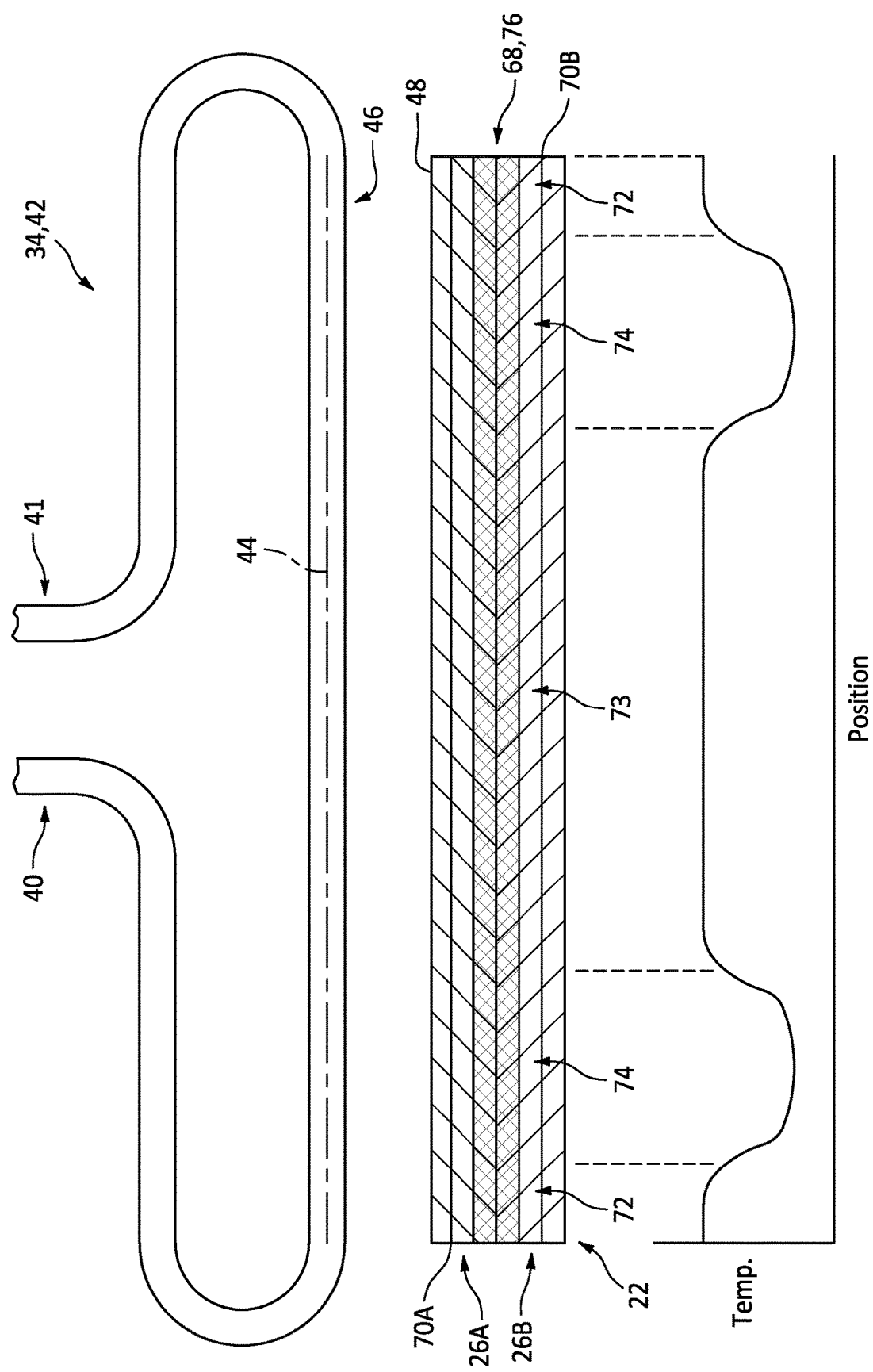
FIG. 8A is an illustration depicting melt layer temperature along the induction welder coil without electromagnetic field concentration.

Referring to FIG. 8A, during induction welding of the workpiece 22 without the EM field concentrators 36, a temperature of a melt layer 68 formed at an interface between the first body 24A and the second body 24B may vary (e.g., significantly) along a longitudinal length of the melt layer 68. The melt layer temperature, for example, may be relatively high at an end 70A, 70B (generally referred to as "70") of the workpiece 22 and its workpiece bodies 24, but quickly dip down and then rise back up as the melt layer 68 extends longitudinally along the welding segment 46/the centerline 44 to a center of the workpiece 22 and its workpiece bodies 24. The temperature along the melt layer 68, for example, may be divided into several regions 72-74. The opposing end regions 72 of the melt layer 68 are located longitudinally at the workpiece ends 70. The intermediate region 73 of the melt layer 68 is located longitudinally centrally along the melt layer 68. Each transition region 74 of the melt layer 68 extends longitudinally between a respective one of the end regions 72 and the intermediate region 73, where a longitudinal length of the intermediate region 73 may be greater than a longitudinal length of each transition region 74, and where the longitudinal length of each transition region 74 may be greater than (or equal to) a longitudinal length of the each end region 72. Each transition region 74, however, is located proximate (e.g., close to) a respective one of the workpiece ends 70. Due to thermodynamic end effects, the melt layer temperature within the transition regions 74 may be lower than the melt layer temperature within one or more of the other regions 72 and/or 73. Such a variation in melt layer temperature may reduce or otherwise compromise a strength of a weld seam 76 between the workpiece bodies 24 under certain conditions.

Figure 8B:
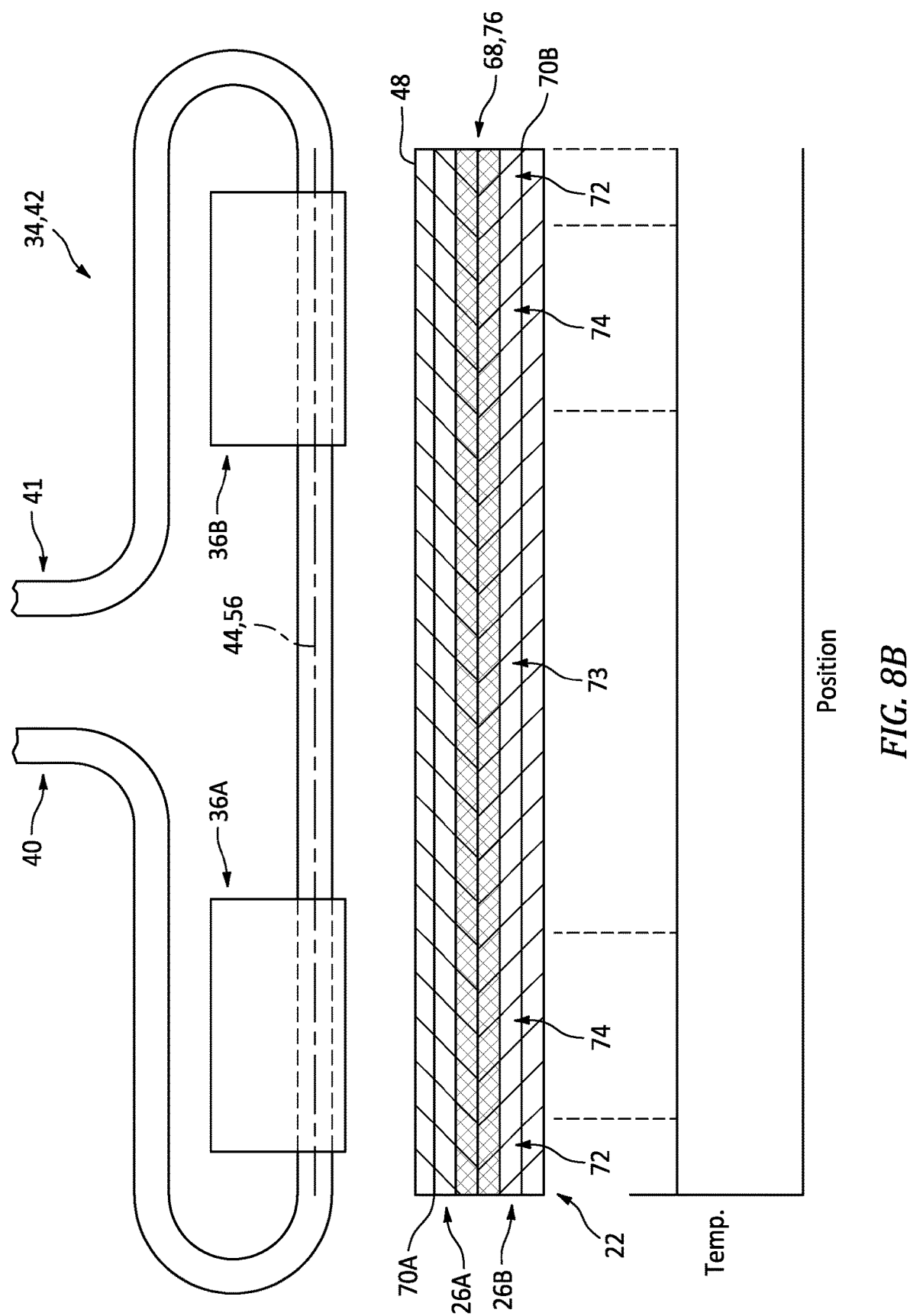
FIG. 8B is an illustration depicting the melt layer temperature along the induction welder coil with select electromagnetic field concentration.

To account for the longitudinal melt layer temperature gradient along the welding segment 46, the EM field concentrators 36 of FIG. 8B are selectively located to raise the melt layer temperature of otherwise relatively cool regions of the melt layer 68; e.g., the transition regions 74. More particularly, by longitudinally aligning the EM field concentrators 36 with predicted low temperature regions of the melt layer 68, each EM field concentrator 36 may concentrate the electromagnetic field to raise the temperature of those low temperature regions of the melt layer 68. For example, each of the EM field concentrators 36 may be longitudinally aligned with and longitudinally overlap a respective one of the transition regions 74 at (or about) a respective one of the workpiece ends 70. With this arrangement, the temperature of the melt layer 68 may remain substantially constant (or within a relatively small range) longitudinally across the workpiece 22.

Figure 9A:
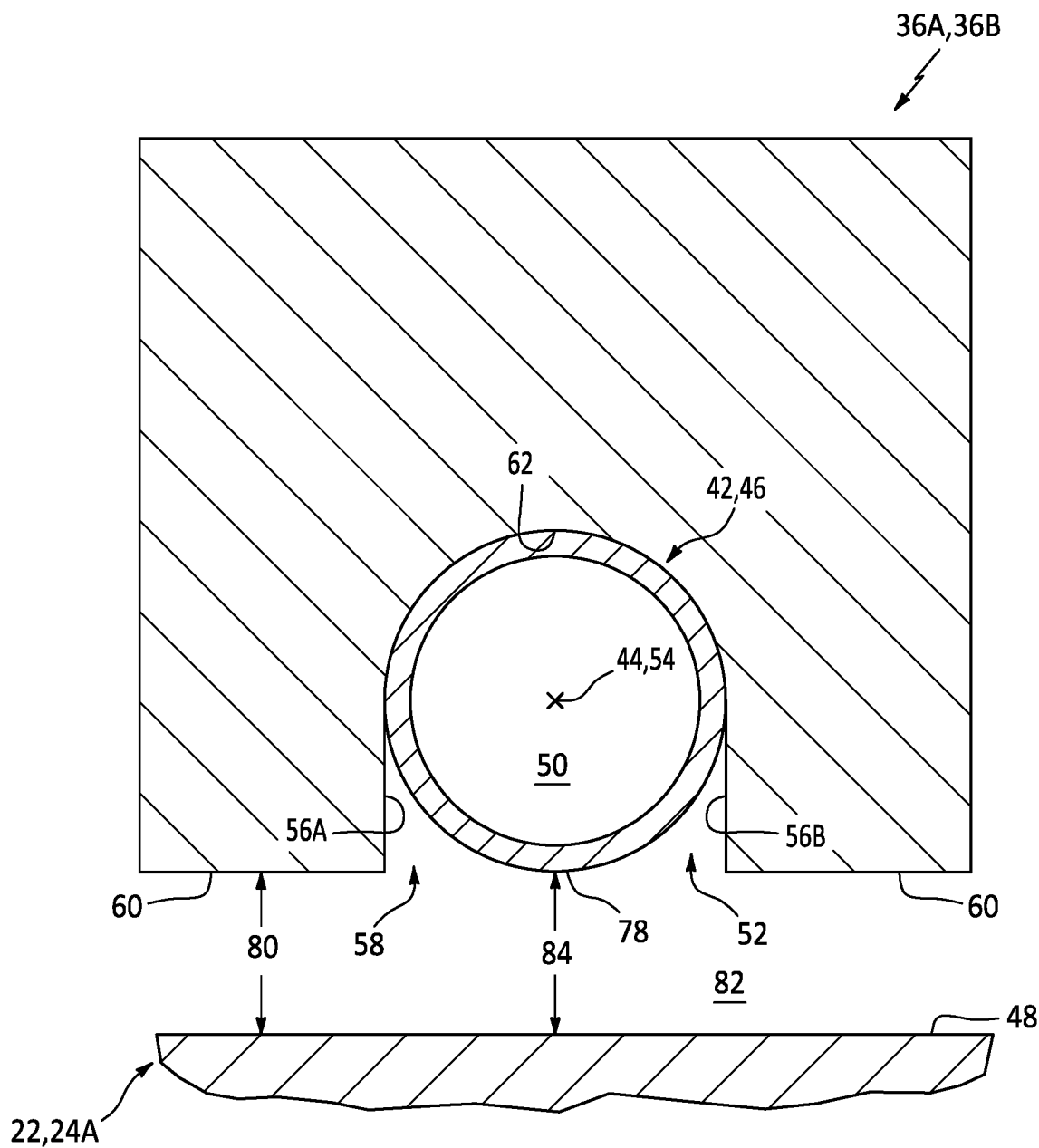
FIGS. 9A and 9B are cross-sectional illustrations of a portion of the induction welder with various different electromagnetic field concentrator configurations next to the workpiece.
Figure 9B:
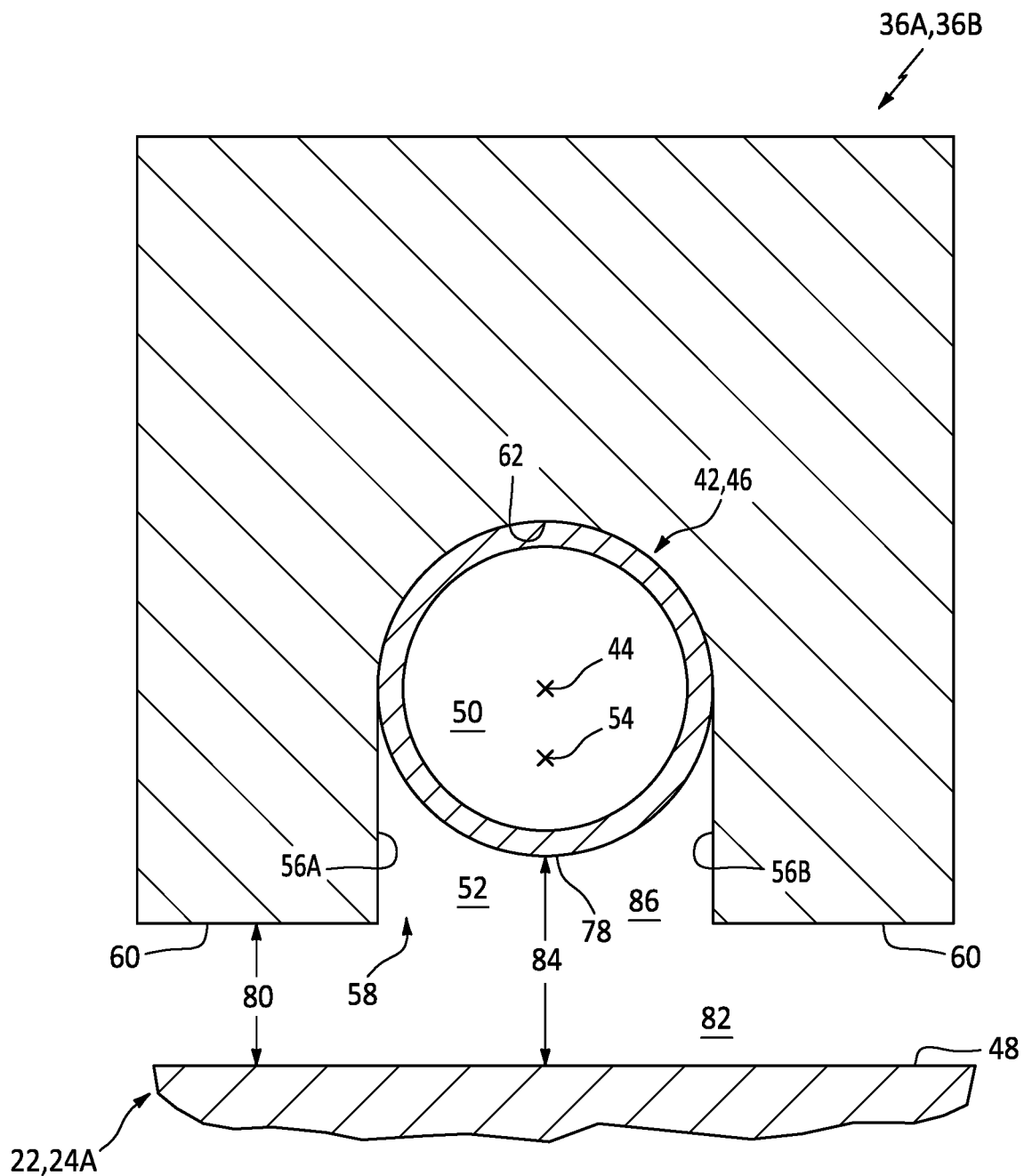

Characteristics of the electromagnetic field concentrated by each EM field concentrator 36 may be tuned by adjusting placement of the induction welding coil 42 and its welding segment 46 within the respective EM field concentrator 36 and its coil receptacle 52. For example, referring to FIG. 9A, the induction welding coil 42 and its welding segment 46 may be arranged flush with the face surface 60. An exterior side 78 of the induction welding coil 42 and its welding segment 46 of FIG. 9A, for example, is vertically aligned with the face surface 60 at the receptacle opening 58. With such an arrangement, a vertical distance 80 through an open volume 82 (e.g., a cavity, an air gap, etc.) from the workpiece 22 and the face surface 60 may be equal to a vertical distance 84 through the open volume 82 from the workpiece 22 to the welding segment 46. The concentrated electromagnetic field may thereby have a relatively large focus area. In another example, referring to FIG. 9B, the induction welding coil 42 and its welding segment 46 may be recessed vertically into the coil receptacle 52 from the face surface

60. The welding segment 46 of FIG. 9B, for example, is spaced vertically inward into the coil receptacle 52 from the receptacle opening 58 by an open receptacle volume 86 (e.g., a cavity, an air gap, etc.) such that the receptacle sides 56 project vertically beyond the coil exterior side 78. With such an arrangement, the vertical distance 80 is less than the vertical distance 84 through the open volume 82, 86 from the workpiece 22 to the welding segment 46. The concentrated electromagnetic field may thereby have a relatively narrow focus area.

The induction welding coil 42 and its welding segment 46 may be attached to each EM field concentrator 36. The welding segment 46, for example, may be secured to each EM field concentrator 36 via a mechanical interface; e.g., an interference fit. The welding segment 46 may also or alternatively be secured to one or more or each of the EM field concentrators 36 via thermally conductive bonding material; e.g., thermally conductive paste. With such arrangements, the induction welding coil 42 and its welding segment 46 are thermally coupled to each EM field concentrator 36 through a thermally conductive interface; e.g., direct contact or through bonding material. With such an arrangement, the cooling device 32 FIG. 1 may direct its fluid (e.g., liquid coolant) through the internal bore 50 to cool the induction welding coil 42 as well as the thermally coupled EM field concentrators 36.

Each of the EM field concentrators 36 may be configured as a monolithic body. Each EM field concentrator 36, for example, may be cast, machined, additively manufactured and/or otherwise formed as a single unitary body. This body may be constructed from or otherwise include a metal material; e.g., an iron based metal. The present disclosure, however, is not limited to such an exemplary concentrator construction or materials.

Figure 10:
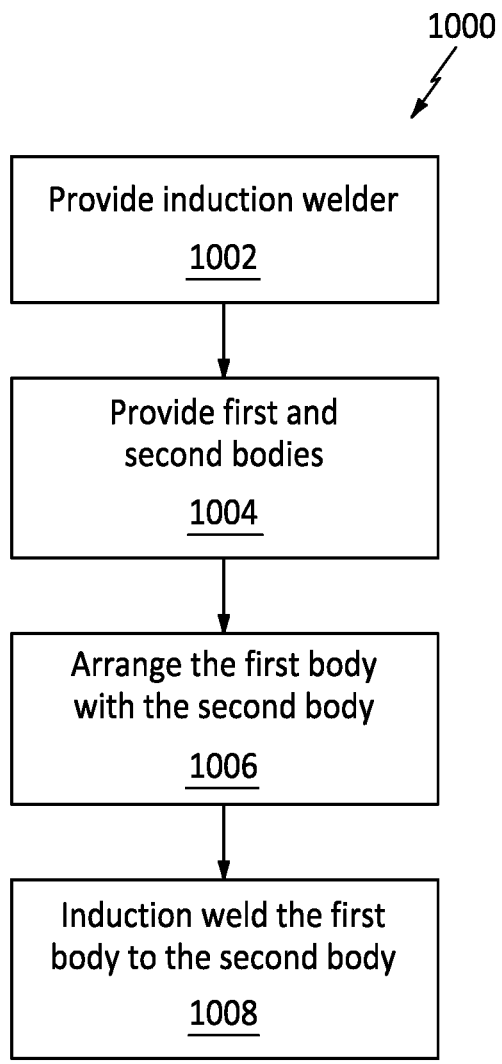
FIG. 10 is a flow diagram of a method for manufacturing the workpiece.

FIG. 10 is a flow diagram of a method 1000 for manufacturing the workpiece 22. This workpiece 22 may be configured as a fan cowl for a nacelle of an aircraft propulsion system. The workpiece 22, however, may alternatively be configured as or may otherwise be included as part of another nacelle component, an aircraft control surface, a wing or an aircraft fuselage. The present disclosure, however, is not limited to manufacturing such exemplary components or to aircraft propulsion system applications. For example, the manufacturing method 1000 may be performed for manufacturing any type or configuration of component where two or more bodies are joined via induction welding. For ease of description, the manufacturing method 1000 is described below with reference to the induction welder 20 of FIGS. 1, 8B and 11. The manufacturing method 1000 of the present disclosure, however, is not limited to any particular induction welder configurations.

In step 1002, the induction welder 20 is provided.

In step 1004, the first body 24A and the second body 24B are provided. Each of these workpiece bodies 24 may be configured as a thermoplastic body. Each of the workpiece bodies 24 of FIG. 11, for example, includes the fiber reinforcement 26 (e.g., carbon fibers) embedded within the thermoplastic matrix 28.

Figure 11:
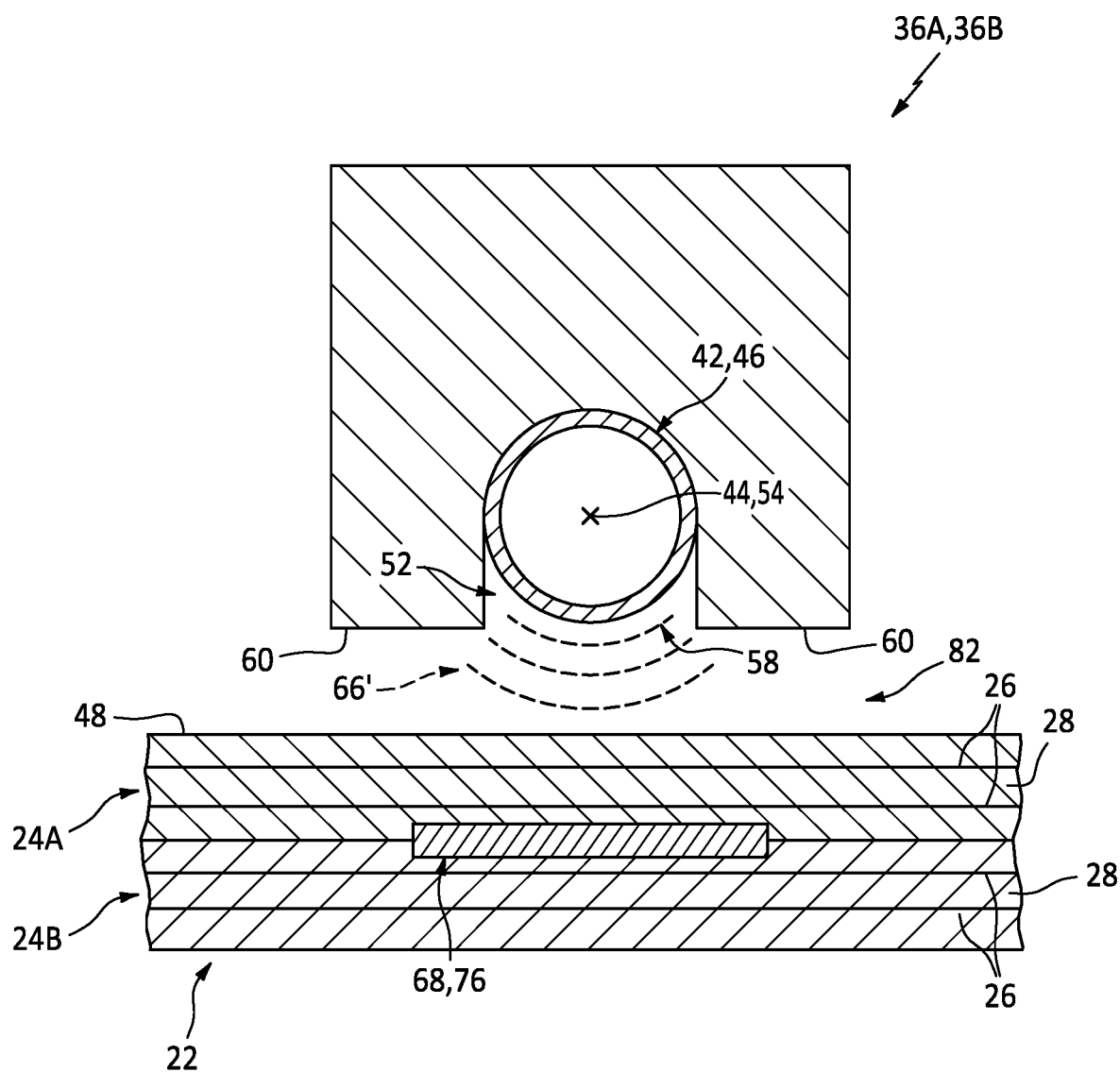
FIG. 11 is a cross-sectional illustration of a portion of the induction welder next to the workpiece during induction welding of the workpiece.

In step 1006, the first body 24A is arranged with the second body 24B. In the arrangement of FIG. 11, the second body 24B is next to and vertically engages (e.g., contacts) the first body 24A. The first body 24A is separated from the induction welding coil 42 and its welding segment 46 as well as each EM field concentrator 36 by the open volume 82. Each face surface 60 faces and is vertically next to (e.g., but, slightly vertically spaced from) the first body 24A.

In step 1008, the first body 24A is induction welded to the second body 24B. The power source 30 (see FIG. 1), for example, may provide a high frequency (e.g., alternating) current to the induction welding coil 42. The induction welding coil 42 may subsequently generate electromagnetic waves. These electromagnetic waves (some of which are unconcentrated and some of which are concentrated by the EM field concentrators 36) excite one or more reinforcement fibers of the fiber reinforcement 26 via eddy currents within the first body 24A and/or one or more reinforcement fibers of the fiber reinforcement 26 via eddy currents within the second body 24B. This excitation may elevate a temperature of the first body 24A and/or the second body 24B to a melting point temperature where the thermoplastic matrix 28 of the first body 24A and/or the thermoplastic matrix 28 of the second body 24B melts. The melt layer 68 may form at the interface between the first body 24A and the second body 24B. This melt layer 68 may bond the first body 24A and the second body 24B together upon cooling thereof where the melt layer 68 provides the elongated weld seam 76. Since the welding segment 46 extends across the entire workpiece 22, the induction welder 20 and its components 34 and 36 may remain stationary (e.g., do not move at all and/or do not move relative to the workpiece 22 and its workpiece bodies 24) during the induction welding step 1008.

Before, during and/or after the induction welding of the first and the second bodies, the cooling device 32 of FIG. 1 may flow coolant through the coil structure 34. The cooling device 32 of FIG. 1, for example, may flow (e.g., circulate) the coolant sequentially through the first lead 40, the induction welding coil 42 and the second lead 41, or vice versa. Flowing of the coolant reduces the temperature of the coil structure 34 as well as the EM field concentrators 36 such that, for example, heat radiated from the induction welding coil 42 and/or the EM field concentrators 36 does not melt the thermoplastic matrix 28 of the adjacent workpiece 22 and its first body 24A.

Referring to FIG. 1, each EP field concentrator 36 has a longitudinal length 87A between its ends 55A and 55B. This concentrator length 87A is less than a longitudinal length 87B of the workpiece 22 and its workpiece bodies 24 between their ends 70A and 70B. The workpiece length 87B, for example, may be more than two times (2×), three times (3×), four times (4×) or more the concentrator length 87A; e.g., between 2× to 15×. The present disclosure, however, is not limited to such an exemplary dimensional relationship. For example, in other embodiments, the workpiece length 87B may be less than two times (2×) greater than or more than fifteen times (15×) greater than the concentrator length 87A.

Figure 12A:
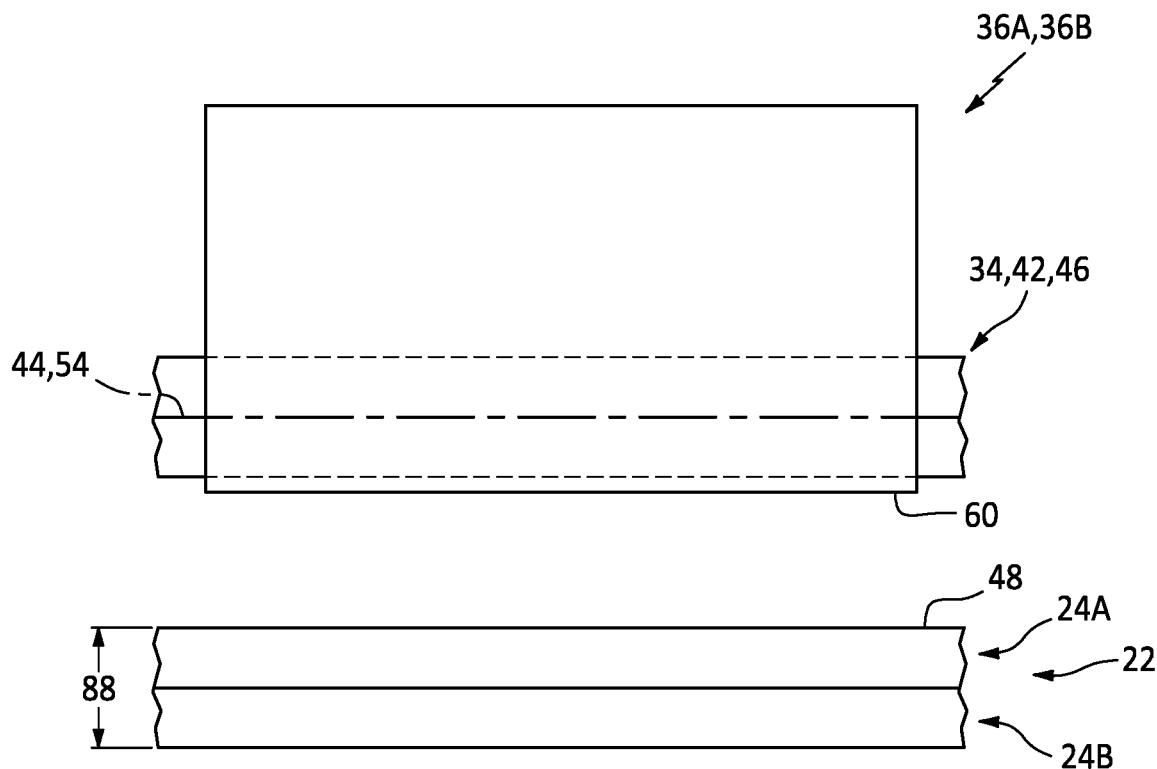
FIGS. 12A and 12B are schematic illustrations of a portion of the induction welder next to various different workpieces.
Figure 12B:
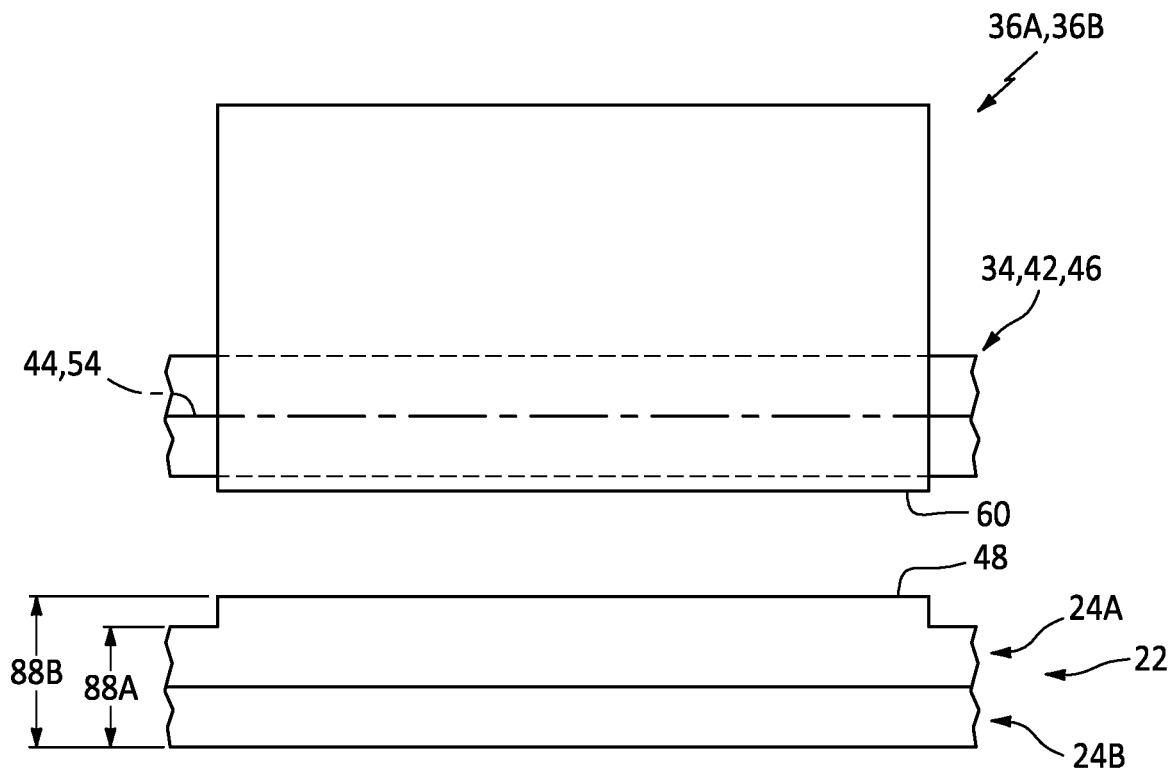

In some embodiments, referring to FIG. 12A, the workpiece 22 and its workpiece bodies 24 may have a uniform vertical thickness 88. The workpiece thickness 88 of FIG. 12A, for example, may remain constant at least longitudinally along the welding segment 46. In other embodiments, referring to FIG. 12B, the workpiece 22 and at least one (or each) of its workpiece bodies 24 may have a variable vertical thickness. A thin portion of the workpiece 22, for example, may have a relatively small workpiece thickness 88A whereas a thick portion of the workpiece 22 may have a relatively large workpiece thickness 88B. A respective EM field concentrator 36 may be longitudinally aligned with (e.g., overlap) the thick portion, and may be longitudinally misaligned from (not overlap) the adjacent thin portion(s).

Figure 13:
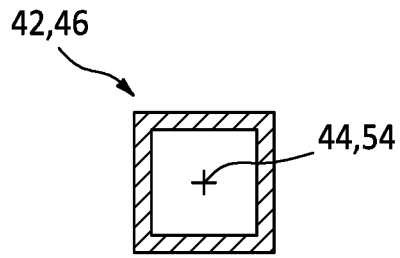
FIG. 13 is a cross-sectional illustration of the induction welding coil configured with a square geometry.
Figure 14:
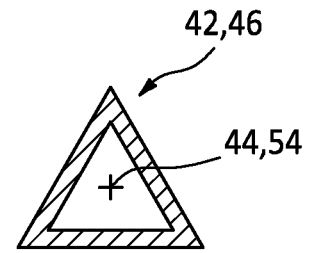
FIG. 14 is a cross-sectional illustration of the induction welding coil configured with a triangular geometry.

In some embodiments, referring to FIG. 11, at least a portion or an entirety of the induction welding coil 42 and its welding segment 46 may have a circular cross-sectional geometry when viewed, for example, in a reference plane perpendicular to the centerline 44, 54. The present disclosure, however, is not limited to such an exemplary configuration. For example, referring to FIGS. 13 and 14, at least a portion or the entirety of the induction welding coil 42 and its welding segment 46 may alternatively have a polygonal cross-sectional geometry when viewed, for example, in the reference plane. The polygonal cross-sectional geometry of FIG. 13 is square. The polygonal cross-sectional geometry of FIG. 14 is triangular. Such polygonal cross-sectional geometries may facilitate decreasing an average distance from the induction welding coil 42 and its welding segment 46 to the bodies being welded where, for example, a flat surface of the coil 42 is parallel with the bodies.

Figure 15:
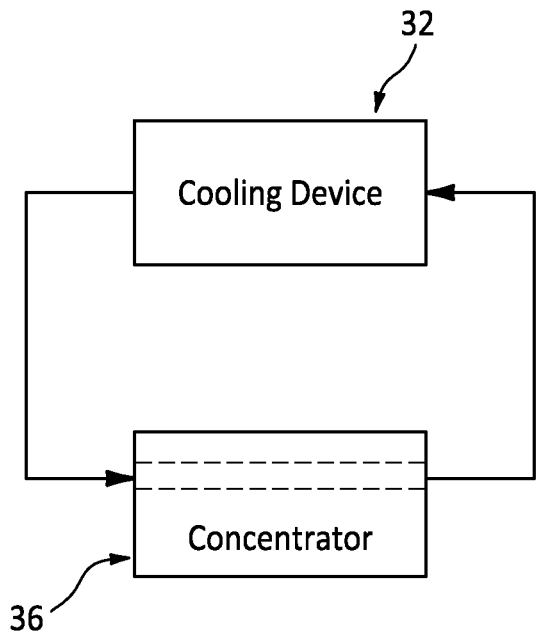
FIGS. 15 and 16 are schematic illustrations of various arrangements for directly cooling the electromagnetic field concentrator.
Figure 16:
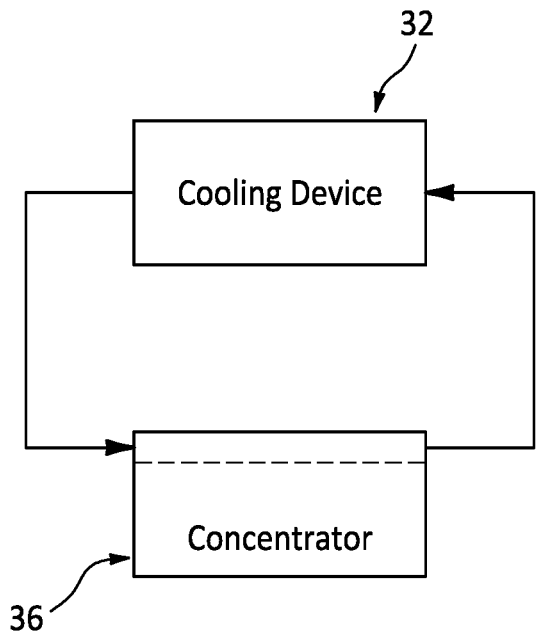

In some embodiments, referring to FIGS. 15 and 16, one or more or all of the EM field concentrators 36 may also or alternatively be directly cooled by the cooling device 32, or another cooling device. The cooling device 32 of FIG. 15, for example, is configured to flow the fluid (e.g., liquid coolant) through one or more internal passages in the EM field concentrator 36. The cooling device 32 of FIG. 16 is configured to flow the fluid through one or more peripheral channels adjacent and/or partially formed by the EM field concentrator 36.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A manufacturing method, comprising:
    providing an induction welder including a concentrator and a coil extending through a receptacle in the concentrator, the receptacle projecting into the concentrator from a face surface of the concentrator;
    providing a first thermoplastic body arranged with a second thermoplastic body, the first thermoplastic body located next to the face surface; and
    induction welding the first thermoplastic body to the second thermoplastic body to provide a weld seam between the first thermoplastic body and the second thermoplastic body, the concentrator extending along a portion of the weld seam, the induction welding comprising
        generating an electromagnetic field with the coil; and
        concentrating a portion of the electromagnetic field with the concentrator onto a region of the first thermoplastic body;
    wherein a workpiece includes the first thermoplastic body and the second thermoplastic body;
    wherein the workpiece along a first portion of the weld seam has a first thickness, and the first portion of the weld seam is overlapped by the concentrator; and
    wherein the workpiece along a second portion of the weld seam has a second thickness that is different than the first thickness, and the second portion of the weld seam is misaligned from the concentrator.

2. The manufacturing method of claim 1, wherein the coil has a polygonal cross-sectional geometry.

3. A manufacturing method, comprising:
    providing an induction welder including a first concentrator, a second concentrator and a coil extending within a first receptacle in the first concentrator and within a second receptacle in the second concentrator, the first receptacle projecting in a first direction into the first concentrator from a first face surface of the first concentrator, and the second receptacle projecting in the first direction into the second concentrator from a second face surface of the second concentrator;
    providing a first thermoplastic body arranged with a second thermoplastic body, the first thermoplastic body located next to the first face surface and the second face surface wherein the first face surface and the second face surface are disposed to a common side of the first thermoplastic body; and
    induction welding the first thermoplastic body to the second thermoplastic body to provide a weld seam between the first thermoplastic body and the second thermoplastic body, the first concentrator spaced from the second concentrator along the weld seam, the induction welding comprising
        generating an electromagnetic field with the coil; and
        concentrating the electromagnetic field with the first concentrator and the second concentrator onto respective regions of the first thermoplastic body.

4. The manufacturing method of claim 3, wherein
    the first concentrator has a concentrator length along a centerline; and
    the weld seam has a seam length along the centerline that is greater than the concentrator length.

5. The manufacturing method of claim 4, wherein the seam length is at least two times greater than the concentrator length.

6. The manufacturing method of claim 3, further comprising cooling at least one of the coil or the first concentrator using liquid coolant.

7. The manufacturing method of claim 6, wherein the cooling comprises directing the liquid coolant through a bore of the coil.

8. The manufacturing method of claim 3, wherein
    the electromagnetic field is concentrated onto the respective regions of the first thermoplastic body to excite first fiber reinforcement within a first thermoplastic matrix of the first thermoplastic body; and
    the excitation of the first fiber reinforcement elevates a temperature of the first thermoplastic matrix to at least a melting point temperature of the first thermoplastic matrix to facilitate bonding of the first thermoplastic body to the second thermoplastic body.

9. The manufacturing method of claim 3, wherein the induction welder is maintained stationary during the induction welding.

10. The manufacturing method of claim 3, wherein an open space extends vertically between the first thermoplastic body and the coil.

11. The manufacturing method of claim 3, wherein an open space extends vertically between the first thermoplastic body and the first concentrator.

12. The manufacturing method of claim 3, wherein the coil is vertically flush with the first face surface.

13. The manufacturing method of claim 3, wherein the coil is recessed vertically into the first receptacle from the first face surface.

14. The manufacturing method of claim 3, wherein the coil is thermally coupled to the first concentrator through a conductive interface.

15. The manufacturing method of claim 3, wherein
a workpiece includes the first thermoplastic body and the second thermoplastic body;
a thickness of the workpiece along the weld seam is uniform.

16. The manufacturing method of claim 3, wherein the coil has a polygonal cross-sectional geometry.

\* \* \* \* \*